June 17, 1958     R. P. COVER     2,839,293
AUXILIARY SPRING FOR WHEEL MOUNTING
Filed June 28, 1955
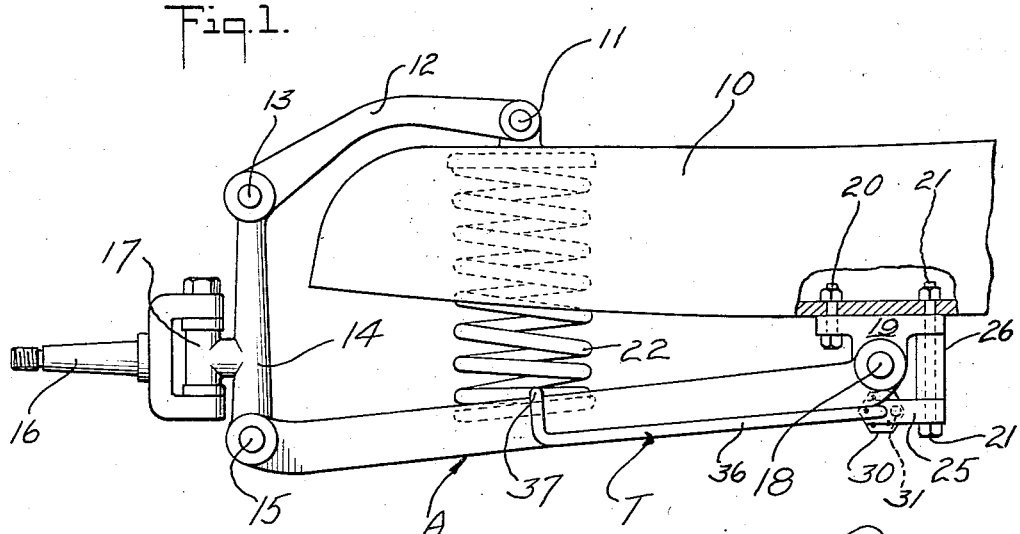
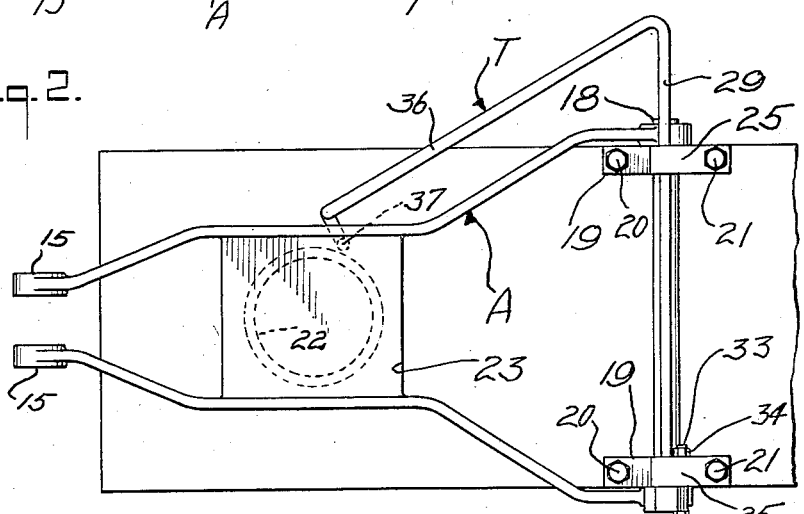
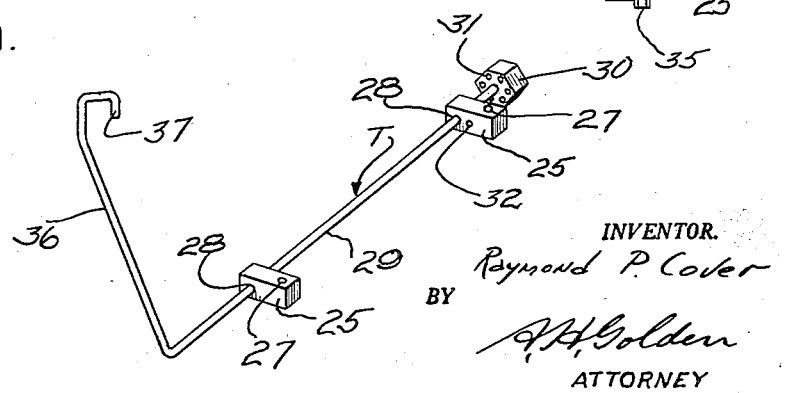
INVENTOR.
Raymond P. Cover
BY
A. H. Golden
ATTORNEY

United States Patent Office 2,839,293
Patented June 17, 1958

2,839,293

AUXILIARY SPRING FOR WHEEL MOUNTING

Raymond P. Cover, Stamford, Conn.

Application June 28, 1955, Serial No. 518,513

9 Claims. (Cl. 267—15)

This invention relates to the mounting of an auxiliary spring in an automobile in a position to assist the standard or conventional spring of the automobile in supporting properly the automobile frame.

In modern automobiles, the front wheels are usually mounted on stub axles that are supported for pivotal movement relatively to the automobile main frame through means of a supporting bracket that is termed an A frame. It is usual to mount a coil spring between this A frame and the main frame of the automobile, this spring accepting the shock transmitted from the wheel carried by the stub axle.

Because of the fact that many automobiles are driven on sloping roads in which the slope is sometimes quite sharp toward the right of the automobile, the spring at the right front end is required to accept a considerably greater part of the load than the spring at the left front end of the car. Those skilled in the art have discovered that auxiliary or bolstering springs are very effective and necessary. As a matter of fact, much work in this art has been carried on by men seeking to provide auxiliary springs and mounting means for those springs, and I have developed several constructions and have obtained patents for those constructions.

As it happens, it is extremely difficult to provide effective mounting means for a spring and for that reason, there has been great resistance to the application of auxiliary springs in many cases where they are extremely important for the proper and effective operation of the automobile.

I believe that the invention forming the concept of this application, provides an extremely simple and effective spring as well as a mounting for the spring. Thus, my invention makes it possible to apply an auxiliary spring in a matter of a few minutes, as will appear presently.

As a feature of my invention, I utilize a torsion spring having a part thereof fitted against the A frame in a manner to bolster the standard coiled spring. As a further feature of the invention, I utilize a mounting for this torsion spring that is secured in position by the same bolt or bolts that support the bearings for the A frame. Even more particularly, it is a feature of my invention that the axis of rotation of the auxiliary spring is juxtaposed to the axis of rotation of the A frame so that there is very little, if any, rubbing between the torsion spring and the A frame as the motion of the A frame is controlled by the torsion spring.

As a still further feature of my invention, I provide exceedingly effective adjusting means for adjusting the tension of the torsion spring of my invention.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a vertical view of a standard automobile A frame assembly showing by invention applied thereto.

Fig. 2 is a view looking upwardly at the assembly of Fig. 1.

Fig. 3 is a perspective view of the torsion spring of my invention, the bearing means and the adjusting means.

Referring now more particularly to the drawings, reference numeral 10 designates the main frame of an automobile to which is pivoted at 11 an arm 12, the arm 12 being in turn pivoted at 13 to a post 14 that is supported for pivotal movement in opposed bearings 15 of the A frame designated by reference letter "A," and best shown in Fig. 2.

The construction of this A frame and the parts I have so far described is conventional, post 14 supporting a stub axle 16 for steering rotation on a steering knuckle 17 in the usual way. The A frame is itself pivoted about a bearing shaft 18 held by a pair of mountings 19, each mounting 19 being secured to the main frame 10 by a short bolt 20 and a long bolt 21, the bolts 20 and 21 being equipped with the usual nuts, to which reference need not be made. A coil spring 22 extends between a seat 23 carried by the A frame and a part of main frame 10.

In the standard assembly found in the prior art, there will be no important variations from the construction I have set forth. Thus, in the usual standard construction, the bolts 21 will naturally be of the same length as bolts 20 and will secure the mounting members 19 to the main frame. Also, the bearings for the A frame may be of slightly different detailed construction.

My invention contemplates the removal of certain of the bolts equivalent to the bolts 20, and the replacing of those bolts with the relatively long bolts 21. Through means of these long bolts 21 it becomes possible to secure to each mounting member 19 a bearing 25, this bearing occupying the position shown in Fig. 1 relatively to the mounting 19. As will be seen, a spacer 26, that may be in the form of a sleeve, lies between each bearing 25 and each mounting 19 and is transversed by one of the relatively long bolts 21. It will be noticed further that the bearing 25 is very closely positioned relatively to the mounting member 19, so that the axis of rotation of the A frame about bearing shaft 18 will be very close to the axis of rotation of my torsion spring designated generally by reference letter T, and best shown in Fig. 3.

There will be two of the bearing members 25, one applied to each of mountings 19 that are found in the conventional A frame mounting. As best seen in Fig. 3, each bearing member 25 is formed with a bore 27 that is traversed by the bolt 21 to secure it in proper position. Each bearing 25 is further formed with a bearing bore 28 in which is mounted the leg 29 of the torsion spring T.

To prevent rotation of one end of the torsion spring T in one of the bearing openings 28, I pin to the end of the leg 29 of the torsion spring, a nut shaped part 30. This part 30 is formed with a series of holes 31, any one of which can be placed in alignment with hole 32 in that one of the bearing members 25 nearest the end of leg 29. Through this arrangement, the torsion spring is rotated about its axis 29 to place it in a particular tensioned position. Thereafter, a bolt is inserted through the hole 32 in bearing 25 and into one of the bores 31 of the part 30. This bolt member is shown in Fig. 2 where it is designated by reference numeral 33, being threaded so as to accept nuts 34 and 35 to lock the part 30 and the bearing 25 against relative rotation.

The torsion spring T extends outwardly to form an arm 36 which is formed with a hook like portion 37 overlying a flange or shoulder of the A frame, as best seen in Figs. 1 and 2. The relationship of the parts is such that any downward movement of frame 10 relatively to the A frame, or upward movement of the A frame relatively to the main frame 10, will be resisted not only by the spring 22 but by torsion spring T. It will be apparent that the torsion spring will twist in the axis of its leg 29 relatively to bearing members 25 with the initial twist being determined by the part 30 and the bolt 33.

It may be said that the axis of rotation of the A frame in the axis of bearing shaft 18 will be in close juxtaposed relation to the axis of rotation of the leg 29 of the torsion spring T so that there will be very little sliding action between the hook like part 37 of the spring and the A frame. I believe that those skilled in the art will now fully appreciate the rather considerable contribution I have made to the art, merely through the substitution of a pair of bolts and the addition of a few parts.

I now claim:

1. In a combination of the class described, an automobile frame, a wheel supporting arm, a bearing member, securing means securing said bearing member to said frame, means pivoting said wheel supporting arm on said bearing member, a spring between said arm and said frame for yieldingly resisting said pivotal movement under load, a torsion rod, a bearing support for said torsion rod also secured to said frame by said securing means, means mounting said torsion rod for torsional rotation on said bearing support, adjusting means secured to said torsion rod in the axis of its rotation relatively to its bearing support, means fastening said adjustment means to said bearing support in any one of a series of positions, and an angular extension at one end of said rod having a portion fitting against a part of said arm to bolster said first spring in resisting pivotal movement of said arm under load.

2. In a combination of the class described, an automobile frame, a wheel supporting arm, a bearing member, securing means securing said bearing member to said frame, means pivoting said wheel supporting arm on said bearing member, a spring between said arm and said frame yieldingly resisting said pivotal movement under load, a torsion rod, a bearing support for said torsion rod also secured to said frame by said securing means, means mounting said torsion rod for torsional rotation on said bearing support, an adjusting device secured to said torsion rod and having a series of openings, securing means extending between one of said openings and an opening in said bearing support, and an angular extension at one end of said rod applied against said arm to bolster said first spring in resisting pivotal movement of said arm under load.

3. In a combination of the class described, an automobile frame, a wheel supporting arm, a bearing member, securing means securing said bearing member to said frame, means pivoting said wheel supporting arm on said bearing member, a spring between said arm and said frame for yieldingly resisting said pivotal movement under load, a torsion rod, a bearing support for said torsion rod also secured to said frame by said securing means, means mounting said torsion rod for torsional rotation on said bearing support, and adjusting collar secured to one end of said torsion rod and having a series of openings, securing means extending between one of said openings and an opening in said bearing support to hold said end of said rod against rotation in its support, and an angular extension at the other end of said rod bearing against a part of said arm to bolster said first spring in resisting pivotal movement of said arm under load.

4. In a combination of the class described, an automobile frame, a wheel supporting arm, a bearing member, means pivoting said wheel supporting arm on said bearing member, a spring between said arm and said frame for yieldingly resisting said pivotal movement under load, a torsion rod, a bearing support for said torsion rod mounting said torsion rod with its torsion axis parallel and juxtaposed to the axis of pivoting of said wheel supporting arm, an adjusting device secured to one of said torsion rod and having a series of openings, securing means extending between one of said openings and an opening in said bearing support to secure said end of the rod against rotation on said support, and an angular extension at the other end of said rod having a portion bearing against said arm to bolster said first spring in resisting pivotal movement of said arm under load.

5. In a combination of the class described, an automobile frame, a wheel supporting arm, a pair of bearing members, a pair of bolts securing each of said bearing members to said frame, means pivoting said wheel supporting arm on said bearing members, a spring between said arm and said frame for yieldingly resisting said pivotal movement under load, a torsion rod, a pair of bearing supports for said torsion rod also secured to said frame by said pairs of bolts, means mounting said torsion rod for torsional rotation on said bearing supports, and an extension at one end of said rod bearing against said arm to bolster said first spring in resisting pivotal movement of said arm under load.

6. In a combination of the class described, an automobile frame, a wheel supporting arm, means pivotally mounting said arm on said frame, a spring between said arm and said frame for yieldingly resisting said pivotal movement under load, a torsion rod having a linear part adapted to lie on a line parallel to the axis of pivotal movement of said wheel supporting arm, means securing said torsion rod to said frame spaced with its linear part spaced and parallel to the axis of rotation of said arm and in juxtaposed relation to said arm, said rod having an integral extension at one end thereof and angular relatively to said linear part, said extension extending from said linear part toward the wheel supporting end of said wheel supporting arm, and a part of said integral extension fitting against a part of said arm to bolster said first spring in resisting pivotal movement of said arm under load.

7. In a combination of the class described, an automobile frame, a wheel supporting arm, bearing means pivotally mounting said arm on said frame, bolts securing said bearing means to said frame, a spring between said arm and said frame for yieldingly resisting said pivotal movement under load, a torsion rod having a linear part adapted to lie on a line parallel to the axis of pivotal movement of said wheel supporting arm, mounting means secured to said frame by said same bolts, said mounting means mounting said torsion rod on said frame with the axis of its linear part spaced and parallel to the axis of rotation of said arm and in juxtaposed relation to said axis of rotation, said rod having an integral extension at one end thereof and angular relatively to said linear part, said extension extending from said linear part toward the wheel supporting end of said wheel supporting arm, and a part of said integral extension fitting against a part of said arm to bolster said first spring in resisting pivotal movement of said arm under load.

8. In a combination of the class described, an automobile frame, a wheel supporting arm, spaced bearing means pivotally mounting said arm on said frame, a spring between said arm and said frame for yieldingly resisting pivotal movement under load, a torsion rod having a linear part adapted to lie on a line parallel to the axis of pivotal movement of said wheel supporting arm, spaced mounting means securing said torsion rod to said frame with its linear part spaced and parallel to the axis of rotation of said arm and in juxtaposed relation to said arm, means fixing one end of said rod against rotation relatively to one of said mounting means, said rod having an integral extension at the other end thereof and beyond the other mounting means and angular relatively to said linear part, said extension extending from said linear part toward the wheel supporting end of said wheel supporting arm, and a part of said integral extension fitting against a part of said arm to bolster said first spring in resisting pivotal movement of said arm under load.

9. In a combination of the class described, an automobile frame, a wheel supporting arm, spaced bearing means pivotally mounting said arm on said frame, fastening means holding said bearing means against said frame, a spring between said arm and said frame for yieldingly resisting said pivotal movement under load, a torsion rod having a linear part adapted to lie on a line parallel to the axis of pivotal movement of said wheel supporting arm, spaced mounting means securing said torsion rod to said frame with the axis of its linear part spaced and parallel to the axis of rotation of said arm and in juxtaposed relation to said axis of rotation, said fastening means also holding said mounting means fixed relatively to said frame, said rod having an integral extension at one end thereof and angular relatively to said linear part, said extension extending from said linear part toward the wheel supporting end of said wheel supporting arm, and a part of said integral extension fitting against a part of said arm to bolster said first spring in resisting pivotal movement of said arm under load.

References Cited in the file of this patent

UNITED STATES PATENTS

| | | |
|---|---|---|
| 1,137,720 | Anderson | Apr. 27, 1915 |
| 2,103,590 | Lefevre | Dec. 28, 1937 |
| 2,148,029 | Matthews | Feb. 21, 1939 |
| 2,542,363 | Sarnac | Feb. 20, 1951 |
| 2,604,319 | Kohr | July 22, 1952 |
| 2,627,404 | Beason | Feb. 3, 1953 |
| 2,770,453 | Cuskie | Nov. 13, 1956 |
| 2,794,632 | Schilberg | June 4, 1957 |